United States Patent [19]

Postal

[11] 3,786,237

[45] Jan. 15, 1974

[54] MECHANICALLY READABLE SYSTEM USING PREMARKED SUBSTRATE

[76] Inventor: Robert H. Postal, 93 Rutgers Pl., Passaic, N.J. 07055

[22] Filed: Mar. 13, 1972

[21] Appl. No.: 234,430

Related U.S. Application Data

[63] Continuation of Ser. No. 105,979, Jan. 12, 1971, abandoned, which is a continuation of Ser. No. 560,321, June 24, 1966, abandoned.

[52] U.S. Cl. 235/61.11 E, 235/61.12 N, 340/146.3 B

[51] Int. Cl. ...... G06k 7/10, G06k 19/06, G06k 9/18

[58] Field of Search .............. 235/61.12 N, 61.11 E; 340/146.3 B, 146.3 A, 146.3 K

[56] References Cited

UNITED STATES PATENTS

| | | | |
|---|---|---|---|
| 2,209,107 | 7/1940 | Brand | 340/146.3 A |
| 3,225,177 | 12/1965 | Stites et al. | 340/146.3 B |
| 2,704,634 | 3/1955 | Rauch | 235/61.12 N |
| 3,444,517 | 5/1969 | Rabinow | 340/146.3 B |
| 3,377,292 | 10/1965 | Halverson | 252/301.3 |

*Primary Examiner*—Daryl W. Cook
*Attorney*—Charles J. Fickey

[57] ABSTRACT

An encoding means comprising a substrate having a plurality of repetitive patterns, each having a plurality of areas of different photoluminescent material and each area overprinted with stylized alphanumeric characters or coded patterns of opaque ink.

5 Claims, 5 Drawing Figures

STYLIZED NUMERIC CHARACTERS FOR NBF INK ENCODING, USING 4 INKS PRINTED IN BANDS

4 INK BAND CODE

STYLIZED NUMERIC CHARACTERS FOR NBF INK ENCODING, USING 4 INKS PRINTED IN BANDS

5 INK LINE CODE

STYLIZED ALPHAMERIC CHARACTERS USING 5 INKS PRINTED IN LINES

INVENTOR.
ROBERT H. POSTAL
BY
Samuel Branch Walker
ATTORNEY

INVENTOR.
ROBERT H. POSTAL
BY
Samuel Branch Walker
ATTORNEY

MECHANICALLY READABLE SYSTEM USING PREMARKED SUBSTRATE

This is a continuation, of application Ser. No. 105,979 filed Jan. 12, 1971, now abandoned; which in turn is a continuation of application Ser. No. 560,321 filed June 24, 1966 andnow abandoned.

This invention relates to improved means for encoding symbols in coded inks comprising a number of photoluminescent materials luminescing in different wavelengths. More particularly the invention includes means for encoding the same symbols or messages with the provision of making at the same time a number of copies.

In the co-pending application of Freeman and Halverson, Ser. No. 437,866, filed Mar. 8, 1965, now abandoned and assigned to the assignee of the present application, there is described a method of encoding symbols or messages by the use of inks containing different combinations of photoluminescent materials and then reading out the message or symbol by illumination with ultraviolet or other short wave radiation. The messages may be secret, that is to say the symbol is not visible in its whole, or the symbols may be visible as well as detectable by ultraviolet illumination. The latter situation presents some advantages, for example for coding of bank checks for different accounts in which it is desirable to be able to read the account number without using ultraviolet light. However, the ultraviolet decoding has the advantages that it is unaffected by the shape of the symbol and is only determined by the presence or absence of the particular photoluminescing components. Mutilated symbols, such as for example the situation which might be presented if a check were carelessly torn off and an 8 appeared like a 9, do not affect the encoding or decoding.

It has also been described in the application of Berry, Ser. No. 526,192, filed Feb. 9, 1966, now U.S. Pat. No. 3,500,047 assigned to the assignee of the present application, to associate certain visible ink components with the photoluminescent components in order to increase the number of symbols which can be recorded. In general, if one is dealing with presence or absence of a particular component, the number of symbols which can be recorded is $2^n - 1$, where $n$ is the number of components possible. The addition of certain visible components multiplies the number of choices where the fact that there are certain components detectable by visible light is not objectionable. Of course illumination has to be both by visible and ultraviolet light with suitable time or area separation in order to prevent confusion. It has also been described in the Freeman and Halverson application referred to above using components in more than one concentration, for example absence, presence in a low concentration, and presence in a high concentration. This of course increases the number of symbols which can be selected because the formula now is $3^n - 1$. However, reliability of decoding decreases somewhat over the presence or absence situation, which might be said, in analogy to electronic circuits, to present the highest signal to noise ratio, the noise being represented by photoluminescent response, which would be spurious.

There is also described in the application of Halverson, Ser. No. 526,184, filed Feb. 9, 1966, now U.S. Pat. No. 3,412,245 and Hirt, Ser. No. 526,062, filed Feb. 9, 1966, now abandoned, both assigned to the assignee of the present application, various procedures in which photoluminescence from different components are also distinguished electrically by different characteristics of the signal.

Other coding procedures, for example using spark spectra decoding, X-ray fluorescence and the like, may be used, and some of these are described and claimed in the co-pending applications of Berry, Ser. No. 526,191, filed Feb. 9, 1966, now U.S. Pat. No. 3,413,481 and Siegel, Ser. No. 526,024, filed Feb. 9, 1966, now abandoned, both assigned to the assignee of the present application.

In spite of the great advances in secrecy, reliability, independence of decoding with symbol shape, and the like, there has still remained several problems, of which one of the important is that there is no good way when the message or symbols are initially being typed or otherwise impressed on paper or other thin substrate to produce copies, analogous to the production of carbon copies in ordinary typewriting. For some purposes the possibility of making exact copies when first encoding is an advantage, and this is made possible for the first time by the present invention as will be described below.

According to the present invention, paper or other suitable substrate is preprinted with coded inks in a repeated pattern, the pattern having a different coded ink in each portion thereof, such as for example an ink containing a photoluminescent material. The patterns may be of any suitable repetitive nature, for example rectangle divided into squares. However, the preferred repetitive pattern is a series of lines or stripes each having a single coded ink component. In the following general description of the invention, the preferred form of pattern, namely lines or stripes, will be used as an illustration, but in the specific description of the invention there will also be described another typical pattern. The number of narrow stripes depends, of course, upon the number of components required, four for numbers only and six where letters and numbers are both needed, as this latter permits choice of 63 symbols. Encoding or printing is now effected with an opaque material, that is to say a material which will not transmit the luminescence when the paper is illuminated with ultraviolet light. Similarly, if visible light components are included, as referred to in the first Berry application mentioned above, the opaque material must also not reflect the visible light. An opaque black pigment is suitable for all purposes. Under UV illumination the pigment or ink needs only to be a strong UV absorber. It can have any color or even be colorless; in effect it is opaque.

In encoding, stylized letters or numbers can be used such that they only cover one or more lines. Wherever there is a portion of a line covered with the opaque material, on illumination and readout in a sufficiently narrow vertical line, for example, for successive symbol spacings, the code becomes apparent, one might say by the reverse of the usual coded ink decoding referred to in the applications mentioned above. In other words, the code is now those lines which were not covered by an opaque material.

As in the case of the various coded ink systems referred to above, it is not necessary that the symbols have any particular shape. They may be dots, circles, or other arbitrary shapes. On the other hand, they may be stylized letters or numbers if it is desired also to be able to read the symbols or messages under ordinary visible light.

The present invention presents the enormous advantage that a number of copies can be made because ordinary or, under certain circumstances, special carbon paper will produce the same opaque areas, and thus it is possible to make carbon copies of the coded ink symbols or messages, which was not hitherto possible. In other words, the present invention, in addition to all of the advantages of the coded ink systems described above, also permits making multiple copies. All that is needed in the present invention is special paper preprinted with the lines of the different components and provided with suitable indicia, such as marks, punched holes or notches and the like, to line up accurately a number of sheets if carbon copies are to be made. It is true that the other coded ink systems could be encoded on ordinary paper, but the difference in cost for preprinted paper under modern mass production conditions is so small as to be insignificant and the enormous advantage of being able to make carbon copies makes the present invention well worth the insignificant added cost of the special paper required.

The present invention also has another advantage over the ordinary coded ink systems in that it is not necessary to provide a special mechanism for making the coded symbols. All that is needed is a typewriter with keys having suitably stylized letters or numbers or arbitrary marks spaced vertically on the type bar. This makes the present invention useful with more economical machines, and there is no problem of confusion, for example more than one coded ink being transferred to another typing key or actuating mechanism. While these problems have been solved by effective means with ordinary coded inks, it is an advantage of the present invention that the additional special, and in some cases rather complicated, equipment is not needed and all that is needed are special type bars, which can be used in an ordinary typewriter or printing presses using ordinary inks, e.g., black printing ink. The possibility of using ordinary inks constitutes an important practical saving, as it is much cheaper to use typewriters or printing presses with the ordinary inks that are employed. In such cases the only special part of the equipment is the type face itself, which, as has been pointed out above, must be in stylized form. Former coded ink representation of symbols has involved printing with special inks with their own particular problems and normally involving a much higher cost. Also, while the paper or other substrate has to be striped with coded inks, this can be done at a central location whereas the printing or typing may be at a number of locations. This makes the use of ordinary inks desirable. In the specification and claims the use of the term "imprinting ink" will be used in the sense of including both customary printing inks, which are usually with a varnish base, and also more or less standard typewriter inks, either for impregnating typewriter ribbons or as the coating for the modern improved carbon ribbon. The term will be used only in the sense set out above.

It is not often that an important new result, the possibility of making carbon copies in the present case, is achieved without any disadvantages and in fact with a simplification of equipment. The present invention, therefore, presents the happy situation where no compromise of one quality or characteristic is required to achieve another and important result.

When photoluminescent materials are used for coding, which is the preferred form of coding in the case of the present invention although it is not limited thereto, there is a considerable problem of sufficiently sharply distinguished fluorescing bands. For this reason, as is described for example in the Halverson and Freeman application above, it is desirable to use as at least one, and if available all, components of the code very sharply and narrowly fluorescent materials which are formed of chelates of lanthanide ions, that is to say rare earth ions having an atomic number greater than 57, the chelates being made up with suitable organic ligands, such as $\alpha,\beta$-diketones, and preferably associated with synergic agents or sheathing agents which enhance the quantum efficiency by reducing radiationless transformation of excited ions when illumination with ultraviolet light is effected. Precisely the same considerations apply here, and the preferred lanthanide chelates are, for example, described in the articles by Halverson, Brinen and Leto in the *Journal of Chemical Physics* for July 1964, pages 157 to 163; Nov. 1964, pages 2752 to 2760; and Volume 42 for June 1965, pages 4213 to 4219. These chelates are typical materials and are illustrative of the type which can be used in the present invention, which however is not limited thereto.

It is not always necessary to use only chelates of lanthanide ions as components for the coded inks, as it is generally possible to include one broader band fluorescor with a number of lanthanide chelates. For example, blue fluorescent materials, such as diphenylanthracene or 4,5-diphenylimidazolone-2, can be employed. This additional choice of fluorescing material is described in the Freeman and Halverson application referred to above and is of course applicable here. If visual light reflecting material as described in the first Berry application referred to above is used, they of course may be chosen in suitable colors, such as for example red, green and blue. Also, binary mixtures, such as purple and yellow, which contain two of the primaries, red and blue in the first case and red and green in the second case, may also be employed. If X-ray fluorescent materials are to be used these can be picked, as described in the Siegel application above referred to, from known materials. In general the present invention does not differ in its choice of photoluminescent, X-ray luminescent, or other coded inks from those which have proven their worth in the earlier systems referred to above. This is an advantage of the present invention as it does not require the development of new materials.

Reference has been made to ordinary typewriters and paper with repetitive stripe patterns. Where the invention is to be used with standard typewriters, with of course the special type bars, this is a very satisfactory and useful modification. However, of course, the present invention can be used with various roll tape typing or printing machines, in which case the alignment problem either does not arise or is greatly simplified. Also, for example, roll tape for adding machines requires only four stripes for the numerical digits and represents a simplification. It is also possible using electric typewriters to employ special folded paper which has guide holes running down the length of both sides of the paper. These choices are mentioned only as typical solutions to the problem of registration of the preprinted lines. Any other suitable form of registration may be used, and again it is an advantage of the invention that no special registration mechanism is required.

The invention will be described in greater detail in conjunction with the drawings, in which.

Figure 1:
FIG. 1 is a sheet of typewriter paper, partly broken away, with a number of preprinted sets of lines for four inks suitable for numerical operation.

In FIG. 1 the sheet of paper is shown at 10 with series of four stripes 1, 2, 3 and 4 for four different coded inks. For example, one stripe can be 4,5-diphenylimidazolone-2 and the other three chelates of curopium, terbium and samarium. Alignment means are shown as holes 6 or printed alignment marks 7 or 8. Of course the punching of holes or printing of the alignment marks must be precise so that satisfactory alignment of the sheets is made possible. Where a number of carbon copies are to be made and if the typewriter is provided with alignment mechanisms, there is an advantage in using the punched holes.

The stripes or lines of the different coded inks 1, 2, 3 and 4 must appear in the same sequential order down the page, but their width is not particularly critical; this is determined by the resolution of the ultraviolet readout mechanisms used. As this resolution is quite high, rather narrow lines may be employed so that type bars of excessive size are not necessary. Of course in FIG. 1 the spacing and width of the lines is exaggerated for clarity.

Figure 2:
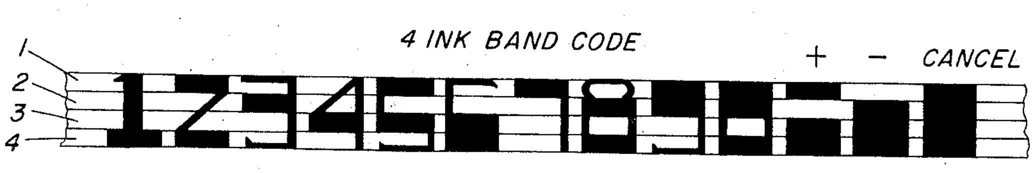
FIG. 2 is an illustration of stylized numerical characters for four line printed papers, such as is shown in FIg. 1.

FIG. 2 shows stylized numeric characters. It will be seen that if an ultraviolet readout reads near the right edge or requires for its threshold sensitivity the full width of a particular character, each character will show a single code. Let us assume that the readout requires a full width in order to give a signal but will give no signal, for example, with half of any one stripe. Obviously, the digit 1 will give a signal having the fluorescence from stripes 1, 2 and 3; 2 would have 2 and 3 only; 3 would have 1 and 3 only; 4 would have 1, 2 and 4 and so on. 0 would have 3 only and a cancel symbol none.

When stylized numbers are used as shown in FIG. 1, they can be read from their shapes without ultraviolet readout. However, they do not have to have stylized shapes and can be combinations of rectangles. For example, in such a case a rectangle covering only stripe 4 would give the same signal as the digit 1.

Figure 3:
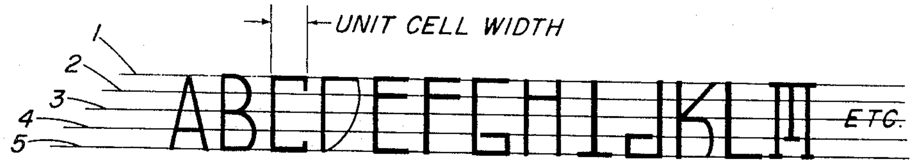
FIG. 3 is a similar illustration of five line paper which permits alpha-numeric characters of a single case.

FIG. 3 shows a similar five-line paper which permits letters and numbers. Here A would have 1, 2, 3 and 5; M 2, 3 and 5; L 1, 2, 3 and 4; I all five, and so on.

Figure 4:
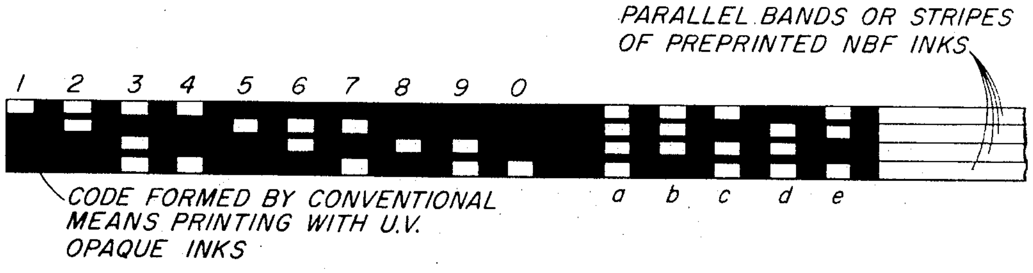
FIG. 4 is an illustration of a slightly different form of printing than that shown in FIG. 2.

FIG. 4 illustrates a different form of printing on five-line or striped paper. It is shown for the 10 digits and the start of letters of a single case. Instead of printing stylized figures or letters which can be read visually, the printing is with a solid ink covering most of the area of the paper with exposed rectangle opposite different stripes. Reading is the same as in the case of FIGS. 2 and 3, but the printing cannot be read easily by visual inspection. This is particularly true if the printing is in the form of an ink which is colorless but does not transmit ultraviolet light. In such a case the message can be entirely secret and yet retain the advantages of being able to make copies. As it is somewhat difficult to produce carbon papers which would imprint in an ink which is transparent to visible light but opaque to ultraviolet, ordinarily only the first copy would be in this form, other carbon copies being colored, such as black. The problem is the same as with FIGS. 2 and 3, as there also it is somewhat difficult to produce carbon papers which would deposit a transparent but ultraviolet opaque image. In the case of FIGS. 2 and 3, however, the problem is not particularly serious as the big advantage of this preferred modification of the present invention is that the message can be read visually as well as under ultraviolet light, and of course there any unavoidable limitations on carbon paper present no problem.

Figure 5:
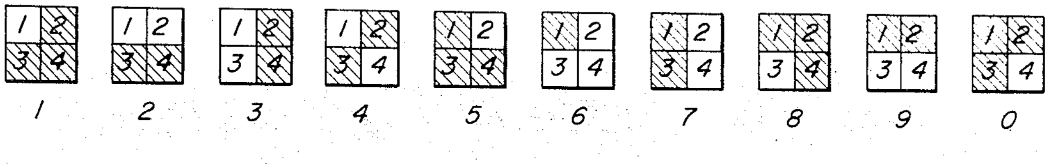
FIG. 5 is an illustration of a different pattern for four component coded inks.

FIG. 5 illustrates a somewhat different repetitive pattern. For simplicity it is shown in four components, which is useful for numbers. The pattern is in the form of squares divided into four smaller squares. As these areas perform the same functions as do the preferred stripes in FIG. 2, they will receive the same reference numerals, namely 1, 2, 3 and 4, each of the individual small squares being preprinted on the paper in a particular component. As in the case of FIG. 2, the printing overcoats one or more rectangles with the ink which is either opaque to both ultraviolet and visible or, if desired, colorless under visible light but opaque to ultraviolet. The 10 digits are illustrated in FIG. 5, printing being shown lightly in hatching. Of course in actual printing the ink would be in a solid square or squares. However, the hatching indication permits seeing the reference numerals through and so has been shown in FIG. 5 to illustrate the invention. The figure, of course, is diagrammatic.

FIG. 5 can be expanded to take care of letters as well as numbers by having a pattern of rectangles with six small squares instead of squares with four small squares. The operation is the same as illustrated in the simpler case of the ten digits which is actually shown in the figure.

It will be noted that the ultraviolet readout is essentially the same in general nature as in the foregoing figures because only the unmasked small squares will fluoresce and the code is interpreted in the same manner as with the preferred preprinted lines or stripes. The lines or stripes lend themselves more easily to printing and, as has been pointed out above, permit also visual recognition of the message by using stylized numbers or letters. The modification of FIG. 5 is essentially only useful for readout with ultraviolet light or other shortwave illumination. Also it is slightly more difficult to preprint the squares without bleeding than is the case with the stripes, which can have a slight separation between them. However, the problem is not too difficult and, therefore, FIG. 5 represents a practical form of repetitive pattern. The figure is illustrative of only one type of pattern which is not in stripes and the invention is, therefore, not limited to these two particular pattern designs.

The above description has been in connection with paper or similar thin substrates which lend themselves to making of carbon copies. It should be understood that while this important advantage of the present invention is limited to such substrates, the advantages of using standard inks are equally important with substrates which do not lend themselves to the making of carbon copies. Examples of certain such substrates are cans, bottles, thick plaques of wood or other material, and the like. All that is needed for this broader aspect of the present invention is that the surface of the substrate be suitable for receiving imprinted characters.

One of the most important fields of usefulness of the present invention is in the imprinting of symbols which can be read either visually or by photoluminescence from shortwave radiation. It has been considered important in connection with coded ink use for certain particular purposes that the message be secret, that is to say not perceptible by ordinary visual examination. This was readily possible with most of the coded inks, which were usually colorless unless particular dye or pigment was added. The same result can be obtained in the present invention wherever it is thought desirable by imprinting symbols with a colorless ink which is a strong ultraviolet absorber. As has been mentioned above, this secret modification is useful only when the symbols are to be read by illumination with ultraviolet light or similar shortwave radiation which causes them to luminesce in the visible. It is also possible to make copies with a special kind of carbon paper which contains no pigment opaque in the visible but only material which is a strong UV absorber. It is also possible to have a combination of results, for example an original imprint with colorless, UV absorbing ink and carbon copies which can be read visibly. The reverse is of course equally effective where the original imprint is with an ordinary imprinting ink and one or more of the carbon papers used are colorless carbon papers. It will be apparent that the present invention is very versatile and for certain purposes this flexibility is of practical value.

I claim:

1. A printable substrate for encoding and readout of coded ink symbols, comprising a substrate and a plurality of repetitive patterns thereon, each such pattern consisting of at least four discrete areas each area having an ink of one coded ink component which emits radiation in a predetermined wavelength range on irradiation with a shorter wavelength radiation, each predetermined wavelength range being different from the wavelength range of the radiation from any other discrete area in the pattern repetition, said substrate being adapted to have certain portions of said repetitive patterns blocked out to encode it in accordance with a predetermined information code, thereby permitting simultaneous reading of a plurality of components in a pattern by wavelength discrimination, to read out said encoded ink symbols.

2. A substrate according to claim 1 in which the printable substrate is paper, and the repetitive pattern is a pattern of stripes.

3. A substrate according to claim 2 in which at least one of the photoluminescent components is a chelate of a lanthanide ion.

4. A substrate according to claim 2 in which means are provided for accurate registration of the stripes on stacked sheets of the paper substrate.

5. A method for processing information which comprises encoding the substrate of claim 1, and thereafter reading said encoded substrate.

* * * * *